(12) United States Patent
Joshi et al.

(10) Patent No.: US 11,282,613 B2
(45) Date of Patent: Mar. 22, 2022

(54) NUCLEAR-POWERED TURBINE ENGINE

(71) Applicant: GENERAL ELECTRIC COMPANY, Schenectady, NY (US)

(72) Inventors: Narendra Digamber Joshi, Guilderland, NY (US); James William Bray, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/733,497

(22) Filed: Jan. 3, 2020

(65) Prior Publication Data

US 2021/0142921 A1    May 13, 2021

Related U.S. Application Data

(60) Provisional application No. 62/934,220, filed on Nov. 12, 2019.

(51) Int. Cl.
| | |
|---|---|
| *G21D 5/12* | (2006.01) |
| *F22B 1/18* | (2006.01) |
| *F01K 11/02* | (2006.01) |
| *F02C 1/10* | (2006.01) |
| *F02C 1/05* | (2006.01) |
| *F02C 6/02* | (2006.01) |
| *F02C 3/00* | (2006.01) |
| *F02C 9/24* | (2006.01) |
| *F02C 9/18* | (2006.01) |

(52) U.S. Cl.
CPC ............... *G21D 5/12* (2013.01); *F01K 11/02* (2013.01); *F02C 1/05* (2013.01); *F02C 1/10* (2013.01); *F02C 3/00* (2013.01); *F02C 6/02* (2013.01); *F02C 9/18* (2013.01); *F02C 9/24* (2013.01); *F22B 1/1823* (2013.01)

(58) Field of Classification Search
CPC ..... G21D 5/12; F02C 9/18; F02C 6/02; F02C 3/00; F02C 9/24; F02C 1/05; F02C 1/10; F01K 11/02; F22B 1/1823
USPC ................... 60/39.463, 644.1, 650, 682–684
See application file for complete search history.

(56) References Cited

U.S. PATENT DOCUMENTS

| | | | | |
|---|---|---|---|---|
| 2,992,177 A | * | 7/1961 | Morrisson | G21D 5/02 |
| | | | | 376/391 |
| 3,410,091 A | * | 11/1968 | Frutschi | F02C 1/10 |
| | | | | 376/391 |
| 3,435,617 A | | 4/1969 | Wagle | |
| 3,899,680 A | | 8/1975 | Burns et al. | |
| 3,911,684 A | | 10/1975 | Busey | |
| 4,000,617 A | * | 1/1977 | Fortescue | F02C 7/143 |
| | | | | 376/391 |
| 4,149,371 A | * | 4/1979 | Spraker | F02C 6/08 |
| | | | | 60/785 |
| 8,621,867 B2 | | 1/2014 | Galbraith | |

(Continued)

FOREIGN PATENT DOCUMENTS

GB          1251939 A      11/1971

*Primary Examiner* — Hoang M Nguyen
(74) *Attorney, Agent, or Firm* — McGarry Bair PC

(57) ABSTRACT

A turbine engine comprising a compressor section and a turbine section in serial flow arrangement defining a working air flow path with a heat exchanger in fluid communication the working air flow path, and a nuclear fuel in thermal communication with the heat exchanger and a release valve in fluid communication with the working air flow path.

24 Claims, 11 Drawing Sheets

(56) References Cited

U.S. PATENT DOCUMENTS

| | | |
|---|---|---|
| 8,822,963 B2 | 9/2014 | Loewen et al. |
| 8,827,209 B2 | 9/2014 | Tillotson |
| 2006/0056570 A1 | 3/2006 | Sutherland |
| 2007/0175223 A1* | 8/2007 | Balan ................. F02C 7/32 60/783 |
| 2015/0252683 A1* | 9/2015 | Hasting ............... F01D 11/20 60/782 |
| 2016/0298500 A1* | 10/2016 | Peter ................... F02C 1/10 |

* cited by examiner

NUCLEAR-POWERED TURBINE ENGINE

CROSS-REFERENCE TO RELATED APPLICATION

This application claims the benefit of provisional application Ser. No. 62/934,220, filed Nov. 12, 2019, titled "NUCLEAR-POWERED TURBINE ENGINE", which is hereby incorporated herein by reference in its entirety.

TECHNICAL FIELD

The disclosure generally relates to a turbine engine, specifically to a turbine engine with nuclear fuel as a heat source.

BACKGROUND

Turbine engines, and particularly gas or combustion turbine engines, are rotary engines that extract energy from a flow of combusted gases passing through the engine onto a multitude of rotating turbine blades.

A turbine engine includes hut is not limited to, in serial flow arrangement, a compressor for compressing air flowing through the engine, a combustor for mixing fuel with the compressed air such that the mixture can be ignited, and a turbine. The compressor, combustor and turbine are sometimes collectively referred to as the core engine. In bypass turbine engines, a fan assembly is provided upstream of the compressor.

The combustor of the turbine engine can use various conventional fossil fuels such as, but not limited to, unleaded kerosene, or a naptha-kerosene blend mixed with compressed air flow from the compressor. The energy density of the fossil fuels undesirably limits the time that an aircraft can remain in flight. All things being equal, the longer the desired flight time, the greater the fuel storage requirements, which increases the size of the aircraft, which increases engine sizing requirements. A turbine engine using a fuel with greater energy density would permit longer flight times for the same size aircraft and/or smaller aircraft as less volume is needed for fuel storage.

BRIEF DESCRIPTION

In one aspect, the disclosure relates to a turbine engine comprising a compressor section, and turbine section in serial flow arrangement to define a working air flow path, a heat exchanger in fluid communication with the working air flow path, a nuclear fuel in thermal communication with the working air flow path, and an air release valve in fluid communication with the working air flow path between the compressor section and the turbine section.

In another aspect, the disclosure relates to a turbine engine comprising a compressor section, combustor section, and turbine section in serial flow arrangement to define a working air flow path, a non-reactor, nuclear fuel heat exchanger in thermal communication with the working air flow path between the compressor section and the combustor section, and an air release valve in fluid communication with the working air flow path between the combustor section and the turbine section.

DETAILED DESCRIPTION OF THE INVENTION

Figure 1:
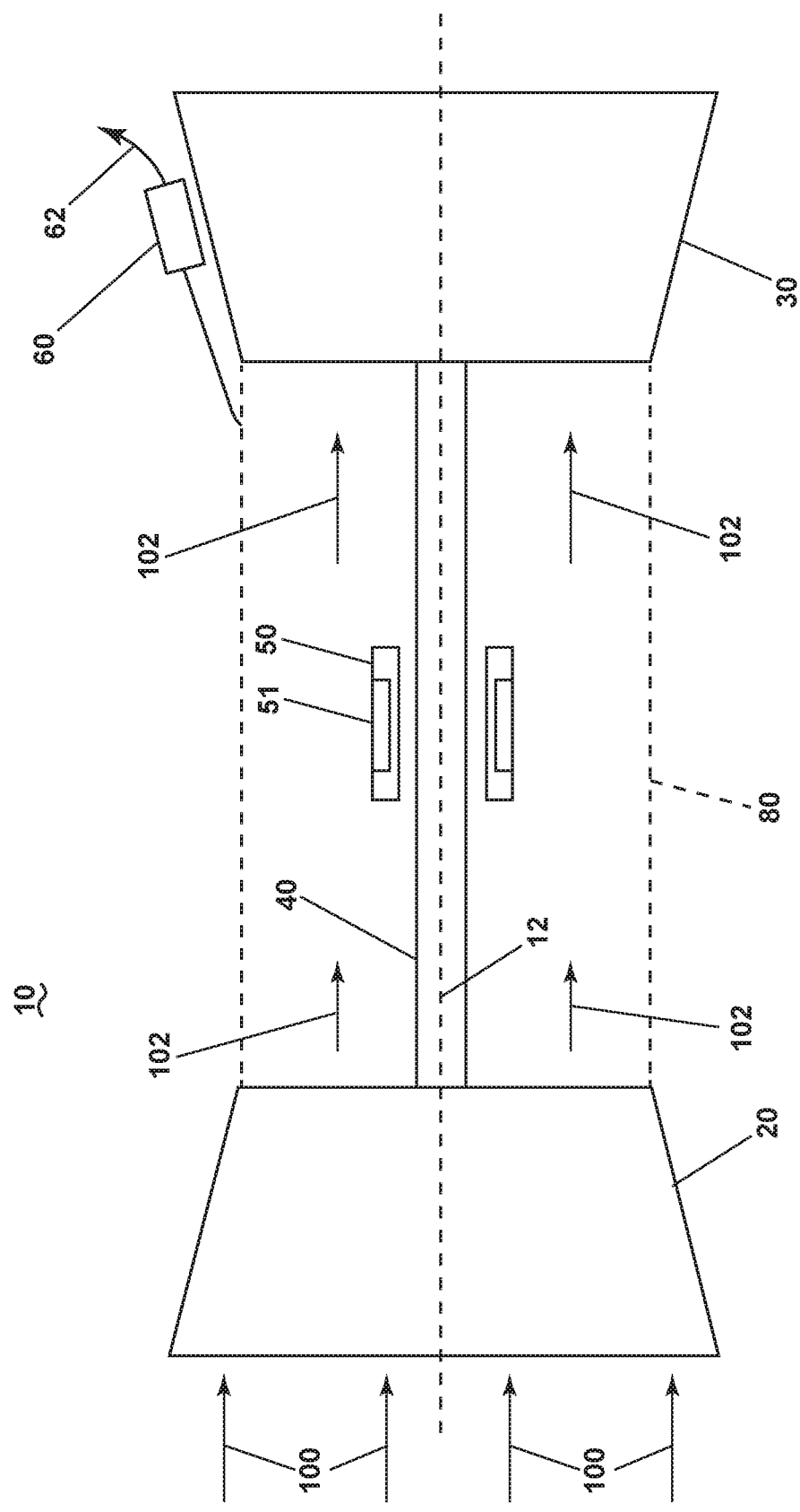
FIG. 1 is a schematic view for a turbine engine with a non-reactor, nuclear fuel heat exchanger and a nuclear fuel as a heat source thermally coupled to a working air flow between compressor and turbine sections.

Aspects of this present description are directed to a turbine engine including at least a compressor section and a turbine section in serial arrangement to define a working air flow path, with a non-reactor, nuclear fuel heat exchanger in fluid communication with the working air flow path. That is, the heat exchanger is not a reactor or in thermal communication with a reactor and includes a nuclear fuel heat source. The turbine engine further utilizes at least one nuclear fuel that generates heat as it decays. As used herein, the term "nuclear fuel" refers to a radioactive isotope that cannot sustain a nuclear chain reaction, and expressly includes non-fissile radioactive isotope. Thus, non-fissile radioactive isotopes are a subset of nuclear fuel as used in this description. However, the nuclear fuel can undergo decay such that heat is emitted from the nuclear fuel. The heat emitted from the decaying nuclear fuel is used to heat a working air flow through the turbine engine. The heat from the nuclear fuel can be conveyed to the working air flow by the heat exchanger. One or more types of nuclear fuel can be used, singly or in combination. Different nuclear fuels can have different rates of decay, resulting in different temperature profiles over time. The different nuclear fuels can be mixed and matched as desired to obtain an overall temperature and lifetime profile. The same or different nuclear fuels can be selectively, wholly or partly, exposed to the working air flow to control the heating of the working air flow. By selecting the type of nuclear material used as the nuclear fuel and selectively controlling the exposure of the working air flow to the nuclear fuel through the heat exchanger, the thrust of the turbine engine can be controlled in much the same way as a throttle setting for a fossil fuel combustor. Additionally, or alternatively, heated working air flow can be exhausted from the turbine engine prior to reaching the turbine or a sub-stage of the turbine to control the thrust of the turbine engine in a manner similar to a throttle setting for a fossil fuel turbine engine. Thus, the type(s) of nuclear fuel selected and thermal communication of the selected nuclear fuel(s) with the working air stream can effectively throttle the power output or thrust of the turbine engine.

Optionally, a combustor section operated in a traditional manner with fossil fuel can be used in addition to the nuclear fuel(s). The heat from the combustor section can be used in lieu of or as a supplement to the heat from the heat exchanger. An afterburner section can be used in lieu of or in combination with the combustor section to provide a fossil-fuel-based heat source.

The utilization of the nuclear fuel instead of fossil fuels can reduce weight for fuel in a conventional passenger aircraft, Which in some transport or commercial aircraft can exceed 230,000 lbs. Such a large amount of fuel requires additional space and structure in the aircraft, all of which impacts the overall aircraft performance, especially flight time. By using nuclear fuel instead of fossil fuel, substantial weight and space savings can be gained in the aircraft. Such weight and space gains are not offset by additional structures associated with using nuclear fuel as the heat source, especially for the non-reactor system. The result is that a non-reactor, nuclear fuel heating system can be accommodated in the aircraft/turbine engine, without compromising the overall efficiency of the aircraft. In fact, the non-reactor, nuclear fuel heating system will improve the performance of the aircraft, especially in terms of flight time or time on station without refueling.

It will be understood, however, that aspects of the disclosure described herein are not so limited and can have general applicability within any turbine engine including a non-reactor, nuclear fuel heat exchanger. For example, the disclosure can have applicability for a turbine engine that can be used in vehicles, and can be used to provide benefits, such as, for example, electrical power in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic view of a turbine engine 10 for an aircraft. The turbine engine 10 can at least include a compressor section 20 and a turbine section 30. A drive shaft 40 rotationally couples the compressor and turbine sections 20, 30, such that rotation of one affects the rotation of the other, and defines a rotational axis 12 for the turbine engine 10.

In operation, ambient or atmospheric air 100 is drawn into the compressor section 20, where the air is compressed. The compressed air then passes through the turbine section 30, where work is extracted from the compressed air, resulting in a rotation of the turbine section 30, which, via the drive shaft 40, rotates the compressor section 20. The air passing serially through the compressor section 20 and then the turbine section 30 can be referred to as the working air flow. The working air flow defines a working air flow path 80 through the turbine engine 10, which is illustrated by arrows 102.

The compressor section 20 can include a plurality of axially spaced stages. Each stage includes a set of circumferentially-spaced rotating blades and a set of circumferentially-spaced stationary vanes. The compressor blades for a stage of the compressor section 20 can be mounted to a disk, which is mounted to the drive shaft 40. Each set of blades for a given stage can have its own disk. The vanes of the compressor section 20 can be mounted to a casing which can extend circumferentially about the turbine engine 10. It will be appreciated that the representation of the compressor section 20 is merely schematic and that there can be any number of stages. Further, it is contemplated, that there can be any other number of components within the compressor section 20.

Similar to the compressor section 20, the turbine section 30 can include a plurality of axially spaced stages, with each stage having a set of circumferentially-spaced, rotating blades and a set of circumferentially-spaced, stationary vanes. The turbine blades for a stage of the turbine section 30 can be mounted to a disk Which is mounted to the drive shaft 40. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 30.

A heat exchanger 50 can be disposed in the working air flow path 80 between the compressor section 20 and the turbine section 30. A source of heat in the form of nuclear fuel 51 can be placed such that it is in thermal communication with at least a portion of the heat exchanger 50. For example, as illustrated, the nuclear fuel 51 is configured within the heat exchanger 50. At least a portion of the nuclear fuel 51 is thermally coupled to the working air flow in the working air flow path 80. The nuclear fuel 51 is used to heat the working air flow as it passes from the compressor section 20 to the turbine section 30. In other words, the nuclear fuel 51 is in thermal communication with the working air flow to ensure a continuous heating of the working air flow.

The heat exchanger 50 can be configured to block or limit radiation from the nuclear fuel 51. It is contemplated, that the heat exchanger 50, or a shielding device separate from the heat exchanger 50, can block or stop the emission of alpha or beta radiation from the turbine engine 10. It is further contemplated, that the heat exchanger 50 can block gamma radiation emitted from the nuclear fuel 51 from exiting the turbine engine 10, Further, depending on the fuel selected, nuclear fuel 51 can require little or no shielding for gamma radiation.

The heat exchanger 50 can be a non-reactor heat exchanger. The heat exchanger 50 transfers the heat generated from the nuclear fuel 51 to the working air flow in the working air flow path 80. It is contemplated that the nuclear fuel 51 is non-fissile nuclear fuel which is a radioactive isotope that cannot sustain a nuclear chain reaction. As used herein, unstable isotopes can be any isotope which will decay into another element, or isotope over time. Unstable isotopes are considered radioactive and can decay by alpha, beta, or gamma decay. Stable isotopes can be any isotope which does not decay or takes a very long time to decay. As such, stable isotopes emit little to no radiation.

It is contemplated that using heat from the radioactive decay of an unstable isotope is preferable to using heat from the fission of a nuclear reactor, especially when used in a vehicle such as an aircraft. The fission of a nuclear reactor typically releases a large amount of heat or gamma radiation. The fission reactor can require a complex system of cooling as well as heavy shielding for the radiation. The additional systems and structure needed to accommodate the nuclear reactor would be impractical to include on with the turbine engine as least in part because of the size and weight of the nuclear reactor and its additional systems.

The heat exchanger 50 can utilize one or more fuel sources selected from a plethora of possible nuclear fuel 51. It is contemplated that when longer flight times are desired, suitable nuclear fuel 51 will have a half-life that can exceed upwards of 1000 days. It is further contemplated that such nuclear fuel 51 will decay through only one or more of alpha decay, beta decay, or gamma decay such as electron absorption or electron capture. The nuclear fuel 51 can be, for example, tungsten 181 (W181) or tantalum 182 (Ta182). W181 is an unstable isotope of tungsten having 74 protons and 107 neutrons in each nucleus. The half-life of W181 is approximately 121.2 days. W181 can decay to Ta181 via electron capture. Ta181 is a stable isotope of the element tantalum.

Ta182 is an unstable isotope of tantalum having 73 protons and 109 neutrons. The half-life of Ta182 is approximately 114.43 days. Ta182 decays to W182 via beta decay. W182 is a stable isotope of the element tungsten. Alternatively, other isotopes can be used such as, but not limited to, isotopes of curium, polonium, gold, lutetium, thulium, dysprosium, gadolinium, samarium, promethium, cerium, cesium, tellurium, antimony, tin, cadmium, ruthenium, selenium, cobalt, manganese, vanadium, or calcium. It is considered, that combinations of isotopes can be used in a single heat exchanger. It is further contemplated, that combinations of isotopes can be used in multiple heat exchangers. Therefore, the half-life of the nuclear fuel 51 can vary between or within heat exchangers.

An air release valve 60 fluidly couples to the working air flow in the working air flow path 80 upstream of the turbine section 30. With such a configuration, at least a portion of the working air flow can be redirected to bypass the turbine section 30. The air release valve 60 can generate a variable flow rate, so that the amount of working air flow bypassing the turbine can be controlled as desired. While a single air release valve 60 is shown, multiple air release valves are contemplated. When multiple air release valves are used, each valve can be, but need not be, variable.

The bypassing of the working air flow around the turbine section 30 provides one method for controlling a thrust or output of the turbine engine 10. Traditional combustion-type turbine engines utilize the heat generated by the combustor section to control the output or thrust. The heat generated by the combustor can be controlled by the rate at which fossil fuel is supplied to the combustor section. Unlike fossil fuels, nuclear fuel 51 emits heat at a fixed rate or continuous rate. Since the rate of heat emitted by the nuclear fuel 51 is not controllable, then controlling the working air flow passing through the turbine section 30 versus exiting through the air release valve 60 enables control of the thrust or output of the turbine engine 10.

A pressure release outlet 62 can be fluidly coupled to atmosphere surrounding the turbine engine 10. In this way, a bypass air is exhausted to atmosphere. The bypass air can be defined as an air flow form the working air flow path 80 which is bled or channeled through the air release valve 60 into the pressure release outlet 62. The bypass air can be channeled and used to drive or power other turbine engine 10 components or vehicle components in the same manner as bypass of a traditional bypass in a turbine engine.

In operation, the ambient or atmospheric air 100 can enter through the upstream side of the compressor section 20 defining at least a portion of the working air flow. As the working air flow passes through the compressor section 20, the compressor section 20 pressurizes the working air flow. The working air flow that was pressurized by the compressor section 20 is supplied to the working air flow path 80. The working air flow is heated by at least a portion of the nuclear fuel 51 as it passes through the working air flow path 80. The working air flow heated by the nuclear fuel 51 passes through the turbine section 30. The heated working air flow expands and rotates the turbine section 30, which drives the compressor section 20 to continue a turbine cycle. The working air flow is ultimately discharged from the turbine engine 10 via exhaust components downstream the turbine section 30, hence creating the thrust or output of the turbine engine 10. The thrust or output of the turbine engine 10 can be a physical thrust of air as used in aircraft applications. Alternatively, the thrust or output of the turbine engine 10 can be a rotational motion of an output drive shaft which can drive an external load such as, but not limited to, an electrical generator or a fan.

If it is desirable to control the thrust or output of the turbine engine 10, some of the working air flow can be selectively exhausted from the working air flow path 80 to bypass the turbine section 30. The air release valve(s) 60 can be controlled to determine the amount of working air flow that becomes the bypass air. For the air release valve(s) 60 defined as non-variable, the time and duration of the opening/closing of the air release valve(s) 60 can be controlled to select the desired bypass air flow. For the air release valve(s) 60 defined as variable, the degree of opening/closing can be selected. If there is a mix of fixed flow rate and variable air release valves 60, they can be correspondingly controlled. Also, the variable air release valves 60 can be controlled in the same way as the fixed flow rate valves. In all instances, a portion of the working air flow can still enter the turbine section 30 to ensure that the compressor section 20 is continuously driven.

Figure 2:
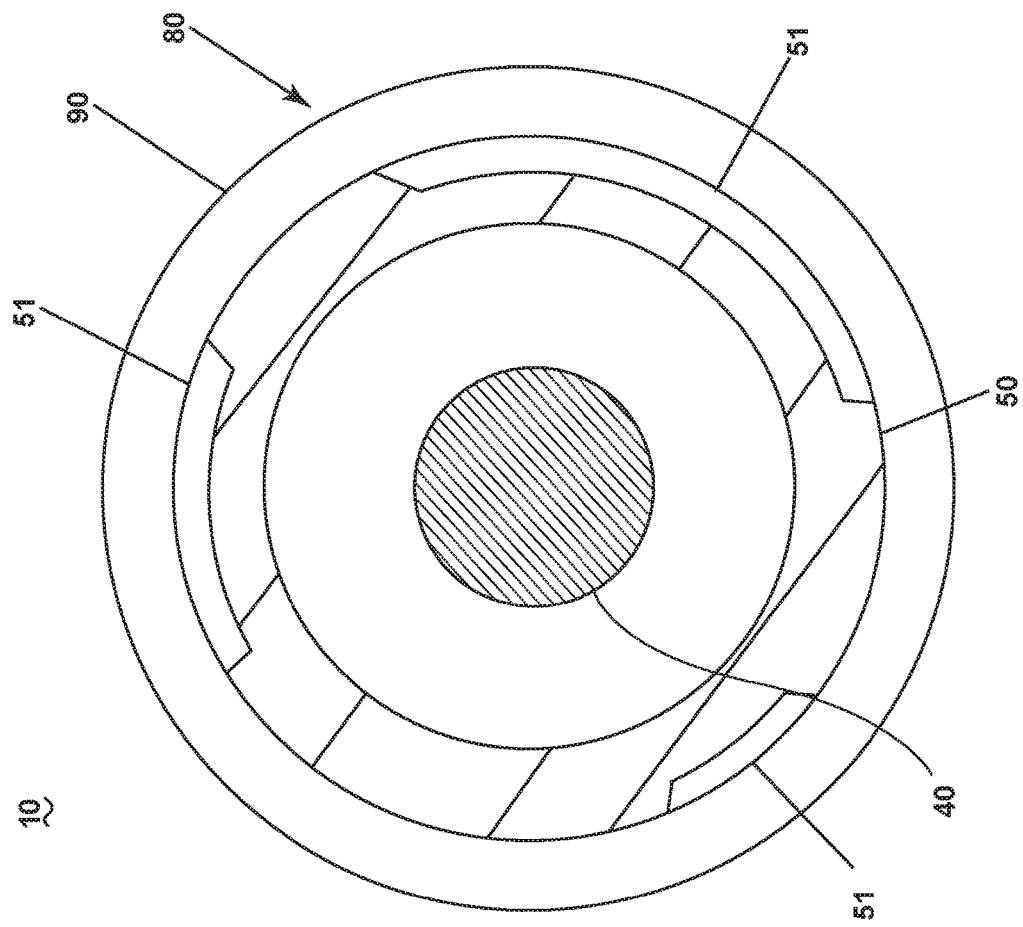
FIG. 2 is a cross section of the turbine engine of FIG. 1 illustrating the non-reactor, nuclear fuel heat exchanger.

FIG. 2 is a schematic view of the turbine engine 10 of FIG. 1 illustrating a cross section of the working air flow path 80. The heat exchanger 50 can be circumferentially arranged about the drive shaft 40. As such, the heat exchanger 50 extends around an entire 360 degrees of the drive shaft 40. The heat exchanger 50 can extend circumferentially about the entirety of the drive shaft 40 and form an annular section within the working air flow path 80. As illustrated, the heat exchanger 50 extends circumferentially about the entirety of the drive shaft 40 in a continuous segment, but other arrangements are contemplated.

Alternatively, the heat exchanger 50 can be segmented and extend around only a portion of the drive shaft 40. There can be any number of heat exchanger segments. For example, there can be 12 evenly spaced heat exchanger segments, with each off the 12 segments extending around at least 30 degrees of the drive shaft 40. There can be any number of one or more heat exchanger segments extending around any portion of the drive shaft 40.

The nuclear fuel 51 can be positioned within the heat exchanger 50 as illustrated. Additionally, or alternatively, the nuclear fuel 51 can be positioned adjacent to at least a portion of the heat exchanger 50. The nuclear fuel 51 can be segmented throughout the heat exchanger 50. As such, portions of the heat exchanger 50 can be in direct contact with the nuclear fuel 51, while other portions of the heat exchanger 50 are not in direct contact with the nuclear fuel 51. As illustrated, the nuclear fuel 51 is dispersed throughout the heat exchanger 50 in three discrete segments. It will be appreciated that there can be any number of segments of any size, positioning, or shape. Alternatively, the nuclear fuel 51 can extend circumferentially around the entirety of the heat exchanger 50.

A shielding 90 can surround the entirety of the heat exchanger 50, or the nuclear fuel 51 such as to block or stop radiation of the nuclear fuel 51. By way of non-limiting example, the shielding 90 can be made out of thin metals, nickel alloys, high temperature alloys, matrix composites, or ceramic sheets.

The nuclear fuel 51 can be removable from the heat exchanger 50 or from within the shielding 90. This can allow for removal or replacement of the nuclear fuel 51 when the heat generated from the nuclear fuel 51 has decreased to a predetermined threshold. That is, the nuclear fuel 51 has undergone a predetermined amount of decay. Alternatively, the entire heat exchanger 50 can be removed from the turbine engine 10 and refueled or replaced with another heat exchanger 50 when the nuclear fuel 51 falls below or no longer reaches the predetermined threshold required to operate the turbine cycle.

The heat exchanger 50 can be alternatively arranged such that it does not extend circumferentially about the drive shaft 40. For example, the heat exchanger 50 can be a non-annular structure which is placed in a portion of the working air flow path 80. Alternatively, the heat exchanger 50 can be placed exterior of the turbine engine 10. For example, the heat exchanger 50 can be placed within a wing of an aircraft in which the turbine engine 10 is connected to. As such, the working air flow which is pressurized by the compressor section 20 can be channeled or diverted to a portion of the wing where the working air flow can come into thermal communication with the heat exchanger 50. From there, the working air flow heated by the heat exchanger can be channeled to the turbine section 30 or subsequent sections of the turbine engine 10. It will be appreciated that the heat exchanger can be placed in other external structures such as, but not limited to, a building, a wall, a radiation-shielding enclosure, or the like.

As used herein, other non-limiting examples of the turbine engine 10 are presented. Like parts can be identified with like numerals. Variations of existing parts (e.g., a variation of the nuclear heat exchanger 50) will increase by 100 with each figure.

Figure 3:
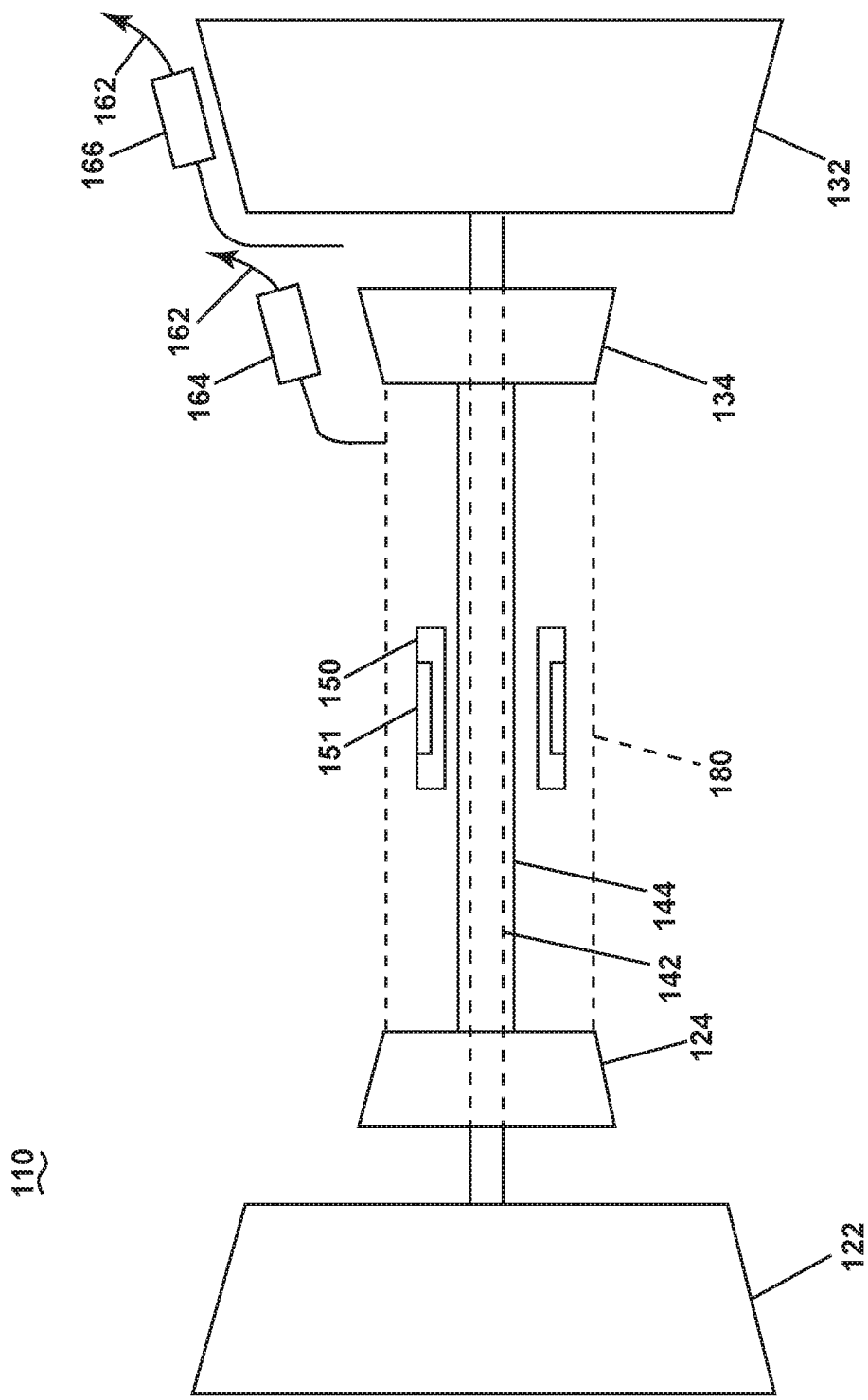
FIG. 3 is a schematic view for the turbine engine of FIG. 1 further including a high-pressure spool and a low-pressure spool for the compressor and turbine sections.

FIG. 3 is a schematic view of a variation of the turbine engine 10 of FIG. 1, with the turbine engine 110 being divided into sub-sections. The turbine engine 110 is similar to the turbine engine 10, therefore, like parts will be identified with like numerals increased by 100, with it being understood that the description of the like parts of the turbine engine 10 applies to the turbine engine 110 unless otherwise noted.

The turbine engine 110 includes a low-pressure (LP) compressor 122, and a high-pressure (HP) compressor 124, and an LP turbine 132, and an HP turbine 134. An LP drive shaft 142 can operatively connect the LP compressor 122 and the LP turbine 132. An LP spool can be defined as the combination of the LP compressor 122, the LP turbine 132, and the LP drive shaft 142 such that the rotation of the LP turbine 132 can apply a driving force to the LP drive shaft 142, which in turn can rotate the LP compressor 122.

An HP drive shaft 144 can operatively connect the HP compressor 124 and the HP turbine 134. An HP spool can be defined as the combination of the HP compressor 124, the HP turbine 134, and the HP drive shaft 144 such that the rotation of the HP turbine 134 can apply a driving force to the HP drive shaft 144 which in turn can rotate the HP compressor 124.

An HP air release valve 164, and an LP air release valve 166 can be placed before, or intermittently with the HP turbine 134, or the LP turbine 132 respectively. The HP and LP air release valves 164, 166 can have the same form and function as the air release valve 60 of FIG. 1, however, the inclusion of the HP and LP air release valves 164, 166 can allow for an increased control of the output work of the turbine engine 110. For example, if a minimum output work is desired, both the HP and LP air release valves 164, 166 can be opened such as to allow the majority of the working air flow in the working air flow path 180 to exit through the one or more pressure release outlets 162. Conversely, if a maximum output work is desired, both the HP and LP air release valves 164, 166 can be closed such that the majority of the working air flow in the working air flow path 180 flows through the turbine section 130 to create the output work.

Figure 4:
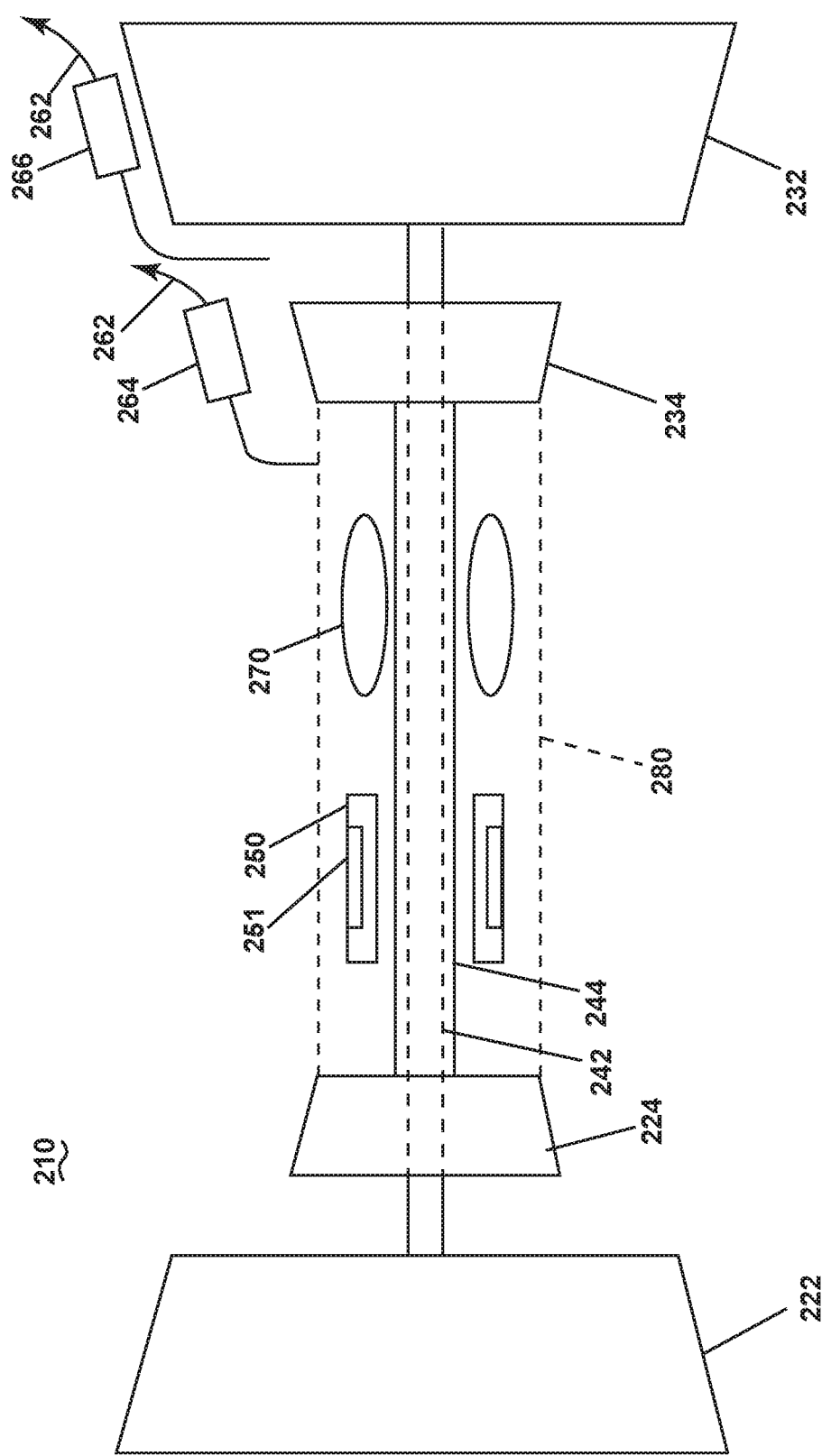
FIG. 4 is a schematic view for the turbine engine of FIG. 3 including the nuclear fuel in thermal communication with the non-reactor, nuclear fuel heat exchanger serially arranged with compressor, turbine, and combustor sections.

FIG. 4 is a schematic view of a turbine engine 210. The turbine engine 210 is similar to the turbine engine 10, 110, therefore, like parts will be identified with like numerals further increased by 100, with it being understood that the description of the like parts of the turbine engine 10, 110 applies to the turbine engine 210 unless otherwise noted. The turbine engine 210 includes at least one combustor section 270 and a heat exchanger 250. The combustor section 270 can provide supplemental heat. As illustrated, the combustor section 270 is in series with the heat exchanger 250, but other arrangements are contemplated.

The combustor section 270 can be placed in the working air flow path 280 and can be adapted to receive the working air flow heated from the heat exchanger 250. The combustor section 270 can receive injected fuel from a fuel reservoir exterior the turbine engine 210. The injection into the working air flow of the fuel can create an air-fuel mixture.

The air-fuel mixture can be ignited, thereby generating combustion gases, and hence a combustion air flow, which can then flow into the HP turbine 234. The ignition of the air-fuel mixture can be done through hot surface igniters, spark igniters, of by pressurizing the fuel with the working air flow. Alternatively, the nuclear fuel 251 can be in thermal communication with the air-fuel mixture or a catalytic surface in thermal communication with the nuclear fuel 251. As such, the nuclear fuel 251 can ignite the air-fuel mixture without the use of the igniters as described herein. The fuel in the fuel reservoir can be conventional fossil fuel, or any other form of suitable fuel source such as, but not limited to, diesel, gasoline, propane, natural gases or jet fuels (e.g., Jet-A, JP4, JP5, JP8, JP10, RPS1, or RPS2), or the like.

The combustor section 270 can be used in instances where an increased thrust or output is desired from the turbine engine 210, especially a short-term increase, such as a burst. The combustor section 270 can provide an additional mass flow and temperature increase in the working air flow as compared to the heat exchanger 250 alone. In such instances, the working air flow in the working air flow path 280 can be heated by the heat exchanger 250 and flow into the combustor section 270 where fuel is injected and combustion occurs. When additional thrust or output is not desired, the heated working air flow can flow through the combustor section 270 without fuel injection or combustion occurring. It will be understood that the combustor section 270 can be located upstream or downstream of the heat exchanger 250. It will be appreciated that increasing the temperature of the working air flow via the combustor section 270 can increase the rotational motion of the HP and LP drive shafts 244, 242. This increase in the rotation speed in conjunction with the increase in the mass flow can increase the thrust or output of the turbine engine 10.

An afterburner (not shown) can be used in place of, or in coordination with, the combustor section 270. The afterburner is typically located downstream of the LP turbine 232 such that at least a portion of the working air flow exiting the LP turbine 232 can flow through and be ignited in the afterburner.

Figure 5:
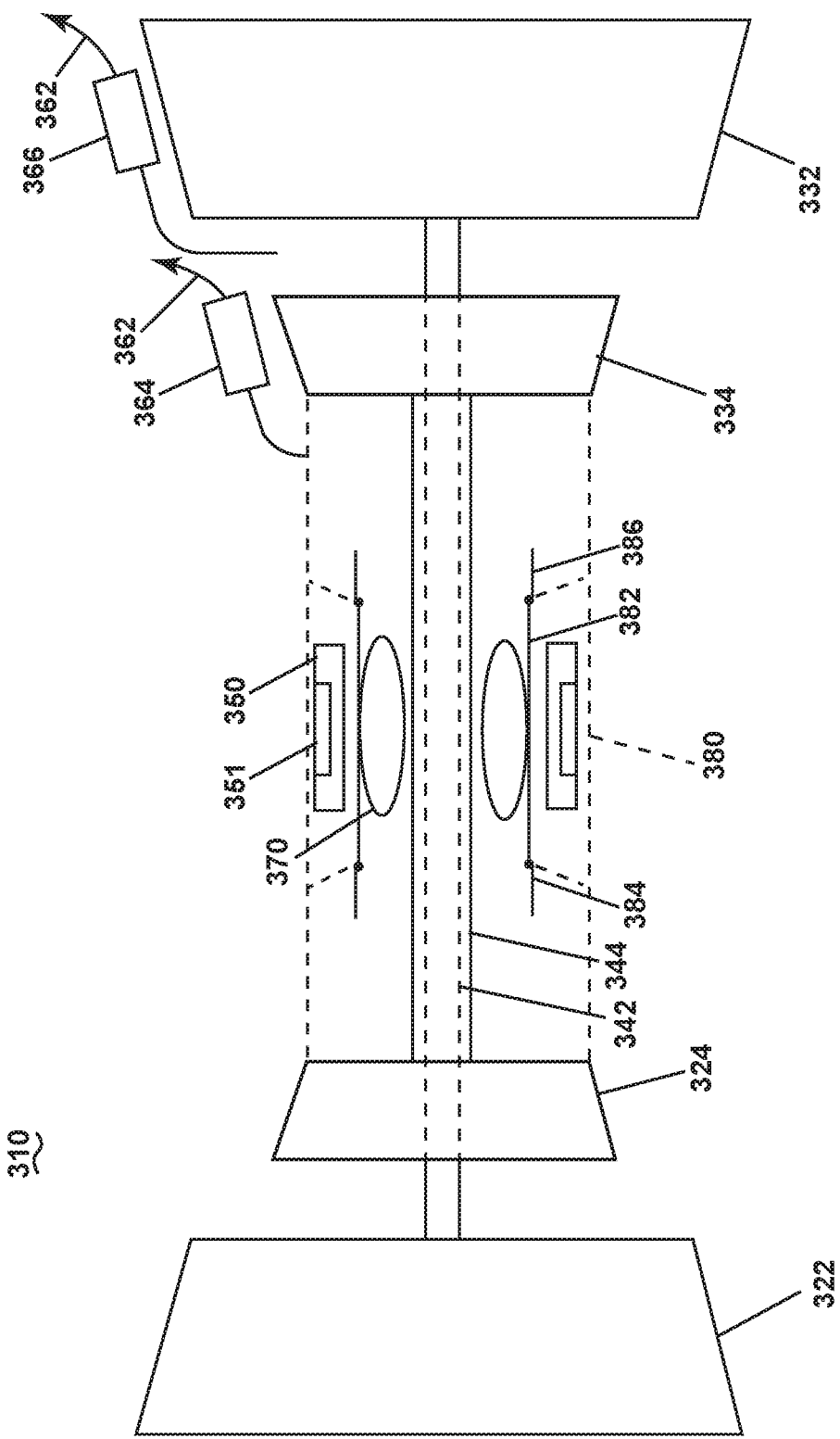
FIG. 5 is a schematic view of the turbine engine of FIG. 4 including the non-reactor, nuclear fuel heat exchanger in parallel with the combustor section.

FIG. 5 is a schematic view of a turbine engine 310. The turbine engine 310 is similar to the turbine engine 10, 110, 210, therefore, like parts will be identified with like numerals further increased by 100, with it being understood that the description of the like parts of the turbine engine 10, 110, 210 applies to the turbine engine 310 unless otherwise noted. The turbine engine 310 includes at least one combustor section 370 and a heat exchanger 350. As illustrated, the combustor section 370 is in parallel with the heat exchanger 350, but other arrangements are contemplated.

The working air flow pressurized by the HP compressor 324 can be directed to either one or both of the combustor section 370 and the heat exchanger 350. In this configuration, the working air flow in the working air flow path 380 can enter the HP turbine 334 as either the working air flow heated by the heat exchanger 350, the working air flow combusted in the combustor section 370, or a combination of both the heated working air flow and the combusted working air flow to the HP turbine 334.

A plurality of ducts 382, upstream gates 384, and downstream gates 386 can be included in at least a portion of the working air flow path 380. The ducts 382 or the upstream or downstream gates 384, 386 can channel the working air flow pressurized by the HP compressor 324 such that it goes into fluid communication with at least the heat exchanger 350. The ducts 382 can act as a physical barrier between at least the combustor section 370 and the heat exchanger 350. As illustrated, the upstream and downstream gates 384, 386 upstream and downstream the heat exchanger 350 are opened. As such, a first portion of the working air flow will flow through combustor section 370. A second portion of the working air flow will flow through the heat exchanger 350. The first portion of the working air flow can be combusted in the combustor section 370. The second portion of the working air flow can come into fluid communication with the heat exchanger 350. The first portion and the second portion of the working air flow can be the same such that the working air flow upstream the combustor section 370 and the heat exchanger 350 is evenly distributed between the heat exchanger 350 and the combustor section 370. Alternatively, the first portion and the second portion of the working air flow can be different. It will be appreciated the upstream gates 384 and the downstream gates 386 can be closed. As such, a majority of the working air flow will be channeled to flow through the combustor section 370.

In instances where the heat from the nuclear fuel 351 is not desired (e.g., the upstream and downstream gates 384, 386 are closed), it is still important to channel at least a portion of the working air flow such that it comes into fluid communication with the heat exchanger 350. This portion of the working air flow can be defined as a cooling air flow. As the nuclear fuel 351 emits a continuous heat, the cooling air flow can be used to ensure that the heat exchanger 350 does not overheat. The mass flow of the cooling air flow can be small enough such that it is only sufficient enough to cool the heat exchanger 350 and not to efficiently run the turbine engine 10. The cooling air flow can be expelled through the air release outlets 362 or enter the HP turbine section 334.

The working air flow which is channeled through the combustor section 370 does not need to be combusted by the combustor section 370. For example, it is contemplated that the pressurized working air flow from the HP compressor 324 can flow into the HP turbine 334 without being heated or combusted. As such, the upstream and downstream gates 384, 386 can be closed such that the pressurized working air flow is channeled through the combustor section 370 only and is therefore not heated. The combustor section 370 can allow the pressurized working air flow to pass without combustion, therefore, supply pressurized working air flow to the HP turbine 334.

It is further contemplated that an additional plurality of upstream and downstream gates 384, 386 can be provided upstream and downstream of the combustor section 370. As such, the working air flow can be selectively channeled through the combustor section 370 through the opening and the closing of the upstream or downstream gates 384, 386. the Alternatively, any combination of upstream and downstream gates 384, 386 can be opened or closed to selectively supply the working air flow to either one of, or both of the heat exchanger 350 or the combustor section 370.

Figure 6:
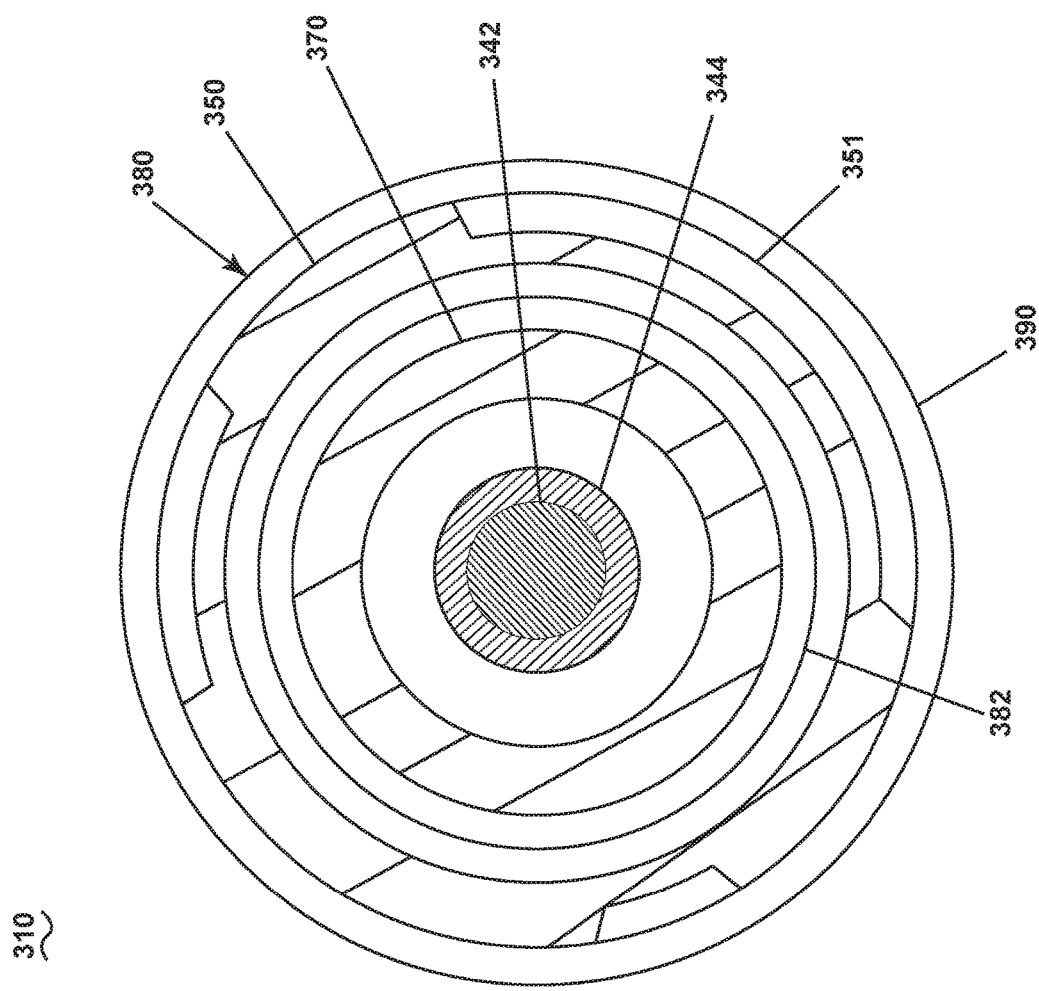
FIG. 6 is a cross section of the turbine engine of FIG. 5 illustrating the non-reactor, nuclear fuel heat exchanger and combustor section.

FIG. 6 is a schematic view of the turbine engine 310 of FIG. 5 illustrating a cross section of the working air flow path 380 of the turbine engine 310. The heat exchanger 350, and a combustor section 370 can be circumferentially arranged about an LP drive shaft 342 and an HP drive shaft 344. As illustrated, the heat exchanger 350 and the combustor section 370 extend circumferentially about the LP and HP drive shafts 342, 346, but other arrangements are contemplated.

Figure 7:
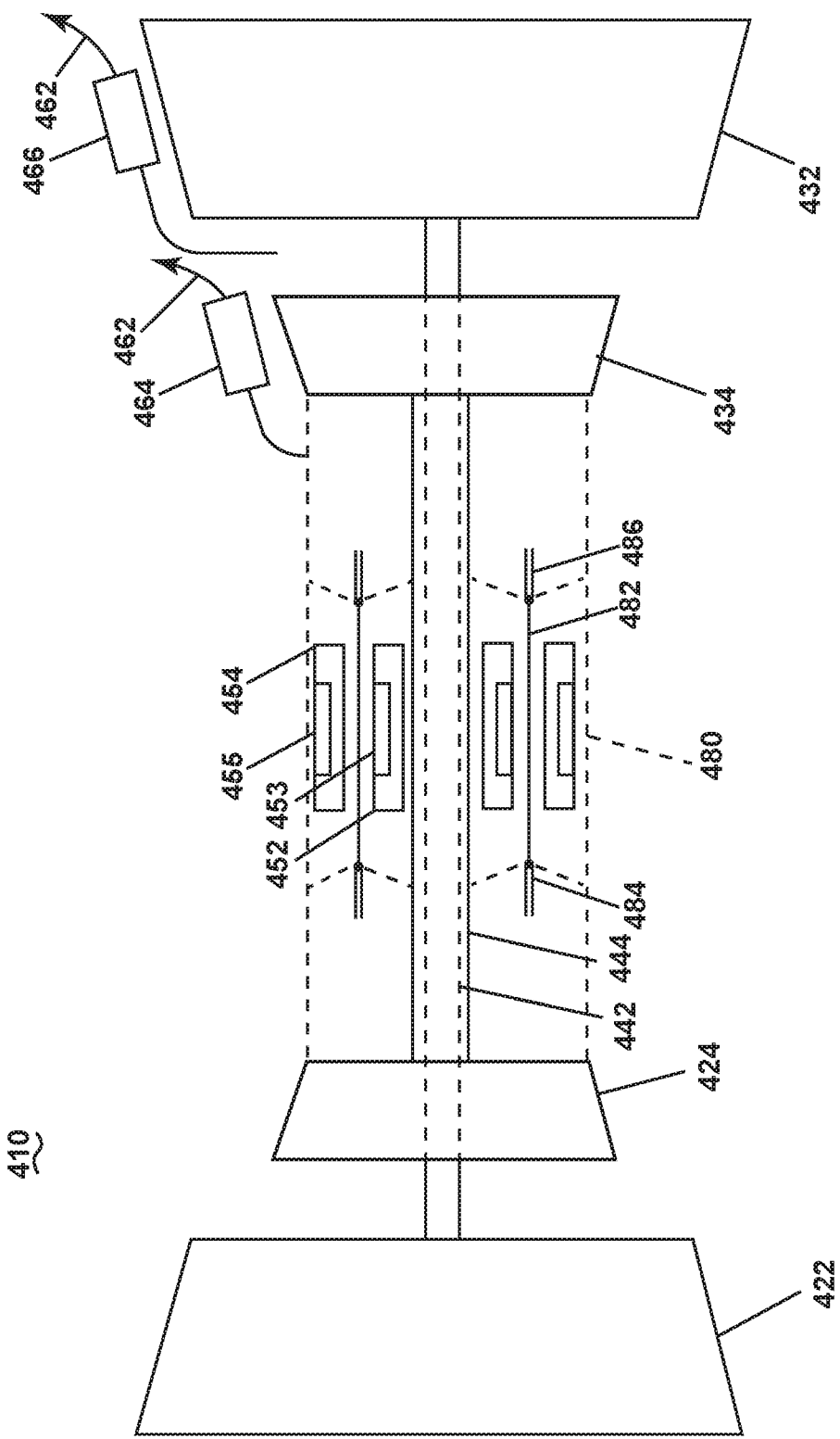
FIG. 7 is a schematic view of the turbine engine of FIG. 1 including the first non-reactor, nuclear fuel heat exchanger, and the second non-reactor, nuclear fuel heat exchanger arranged in parallel.

FIG. 7 is a schematic view of a turbine engine 410. The turbine engine 410 is similar to the turbine engine 10, 110, 210, 310, therefore, like parts will be identified with like numerals further increased by 100, with it being understood that the description of the like parts of the turbine engine 10, 110, 210, 310 applies to the turbine engine 410 unless otherwise noted. The turbine engine 410 includes at a first heat exchanger 452 and a second heat exchanger 454. The first and second heat exchangers 452, 454 can be arranged in parallel. The first and second heat exchangers can be selectively engaged by opening and closing one or more upstream gates 484 or one or more downstream gates 486.

The first heat exchanger 452 can be in thermal communication with a first nuclear fuel 453. The second heat exchanger 454 can be in thermal communication with a second nuclear fuel. 455. The first nuclear fuel 453 can be different from the second nuclear fuel 455. Alternatively, the first and second nuclear fuels 453, 455 can be the same.

The selective engagement of either of or both of the first and second heat exchangers 452, 454 can effectively control further control the temperature of the working air flow in a working air flow path 480. This is done by thermally coupling the working air flow in the working air flow path 480 to one or more of the first or second nuclear fuels 453, 455. It will be appreciated that there can be any number, or combination of nuclear fuels. It will be further appreciated that there can be any number of heat exchangers.

Figure 8:
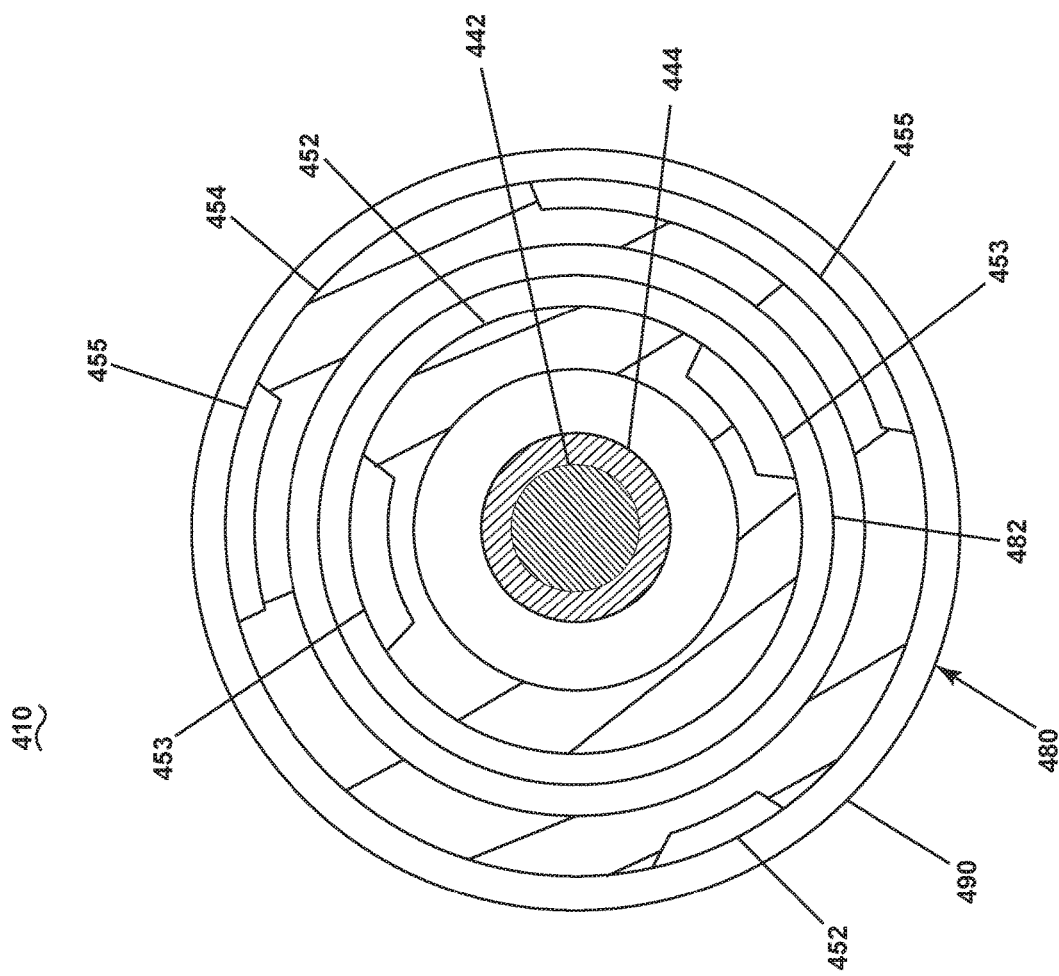
FIG. 8 is a cross section of the turbine engine of FIG. 7 illustrating the non-reactor, nuclear fuel heat exchangers.

FIG. 8 is a schematic view of the turbine engine 410 of FIG. 7 illustrating a cross section of the working air flow path 480 of the turbine engine 410. The first and second heat exchangers 454, 456 can be circumferentially arranged about an LP drive shaft 442 and an HP drive shaft 444. As illustrated, the first and second heat exchangers 554, 556 extend circumferentially about the LP and HP drive shafts 542, 546, but other arrangements are contemplated.

Figure 9:
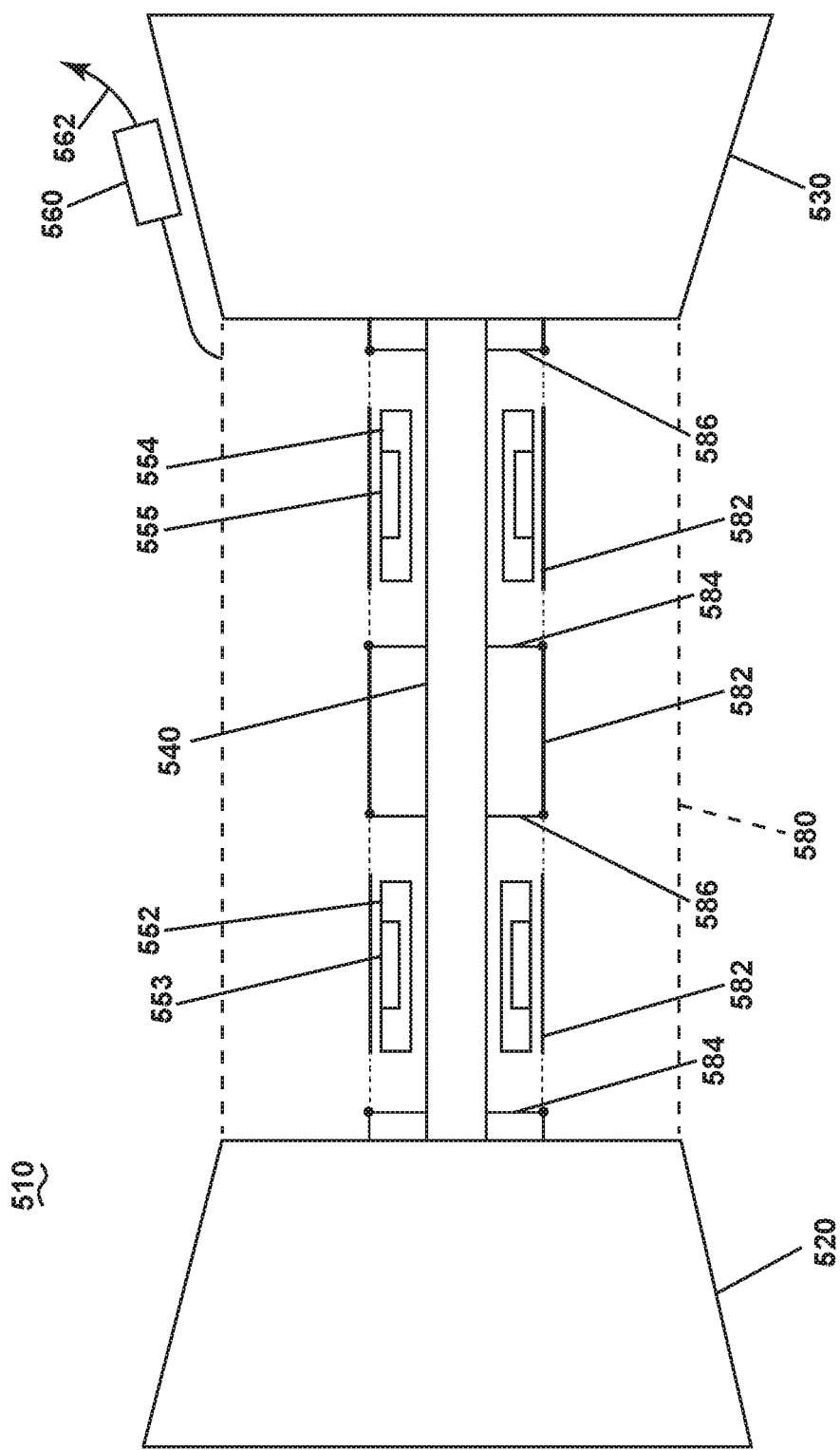
FIG. 9 is a schematic view of the turbine engine of FIG. 7 including a first non-reactor, nuclear fuel heat exchanger, and a second non-reactor, nuclear fuel heat exchanger within the working air flow path.

FIG. 9 is a schematic view of a turbine engine 510. The turbine engine 510 is similar to the turbine engine 10, 110, 210, 310, 410, therefore, like parts will be identified with like numerals further increased by 100, with it being understood that the description of the like parts of the turbine engine 10, 110, 210, 310, 410 applies to the turbine engine 510 unless otherwise noted. The turbine engine 510 includes a first heat exchanger 552 and a second heat exchanger 554. The first and second heat exchangers 552, 554 can be selectively engaged by opening and closing the upstream and downstream gates 584, 586.

Figure 10:
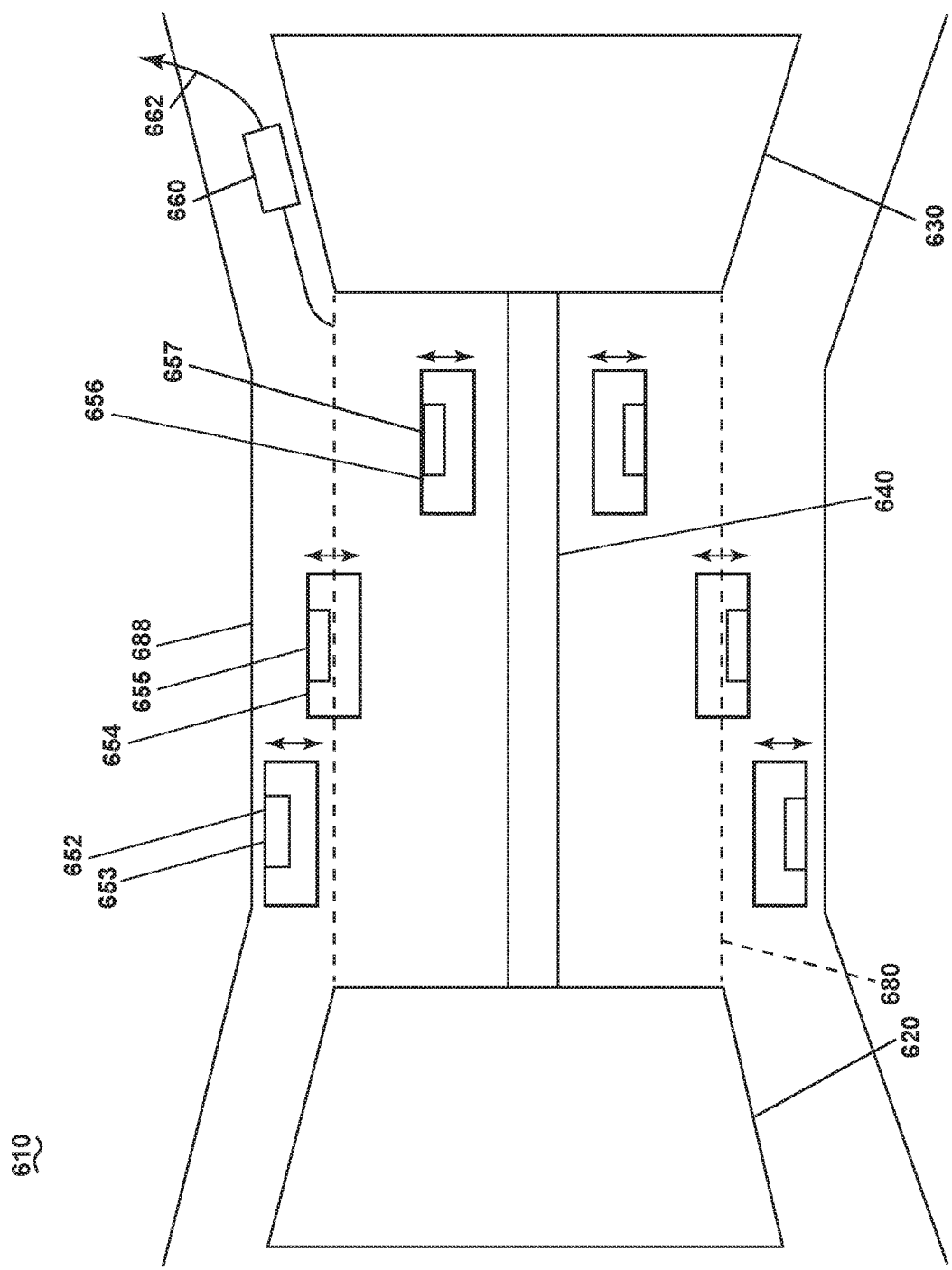
FIG. 10 is a schematic view of the turbine engine of FIG. 1 illustrating repositionable non-reactor, nuclear fuel heat exchangers.

FIG. 10 is a schematic view of a turbine engine 610. The turbine engine 610 is similar to the turbine engine 10, 110, 210, 310, 410, 510, therefore, like parts will be identified with like numerals further increased by 100, with it being understood that the description of the like parts of the turbine engine 10, 110, 210, 310, 410, 510 applies to the turbine engine 610 unless otherwise noted. The turbine engine 610 includes at an air bypass duct 688, a first heat exchanger 652, a second heat exchanger 654, and a third heat exchanger 656. The first, second, and third heat exchangers 652, 654, 656 can be variably positioned between a working air flow path 680, and the air bypass duct 688. The first, second, and third heat exchangers 652, 654, 656 can include a first, a second, and a third nuclear fuel 653, 655, 657 respectively.

The air bypass duct 688 can be a fully enclosed portion of the turbine engine 610. The air bypass duct 688 can act as a barrier from thermal communication between the first, second, of third nuclear fuels 653, 655, 657 and the working air flow path 680 or an exterior of the turbine engine 610. At least a portion first, second, or third nuclear fuels 653, 655, 657, or the first, second, or third heat exchangers 652, 654, 656 can be moved inward or outward relative to the working air flow path 680. As illustrated, the first nuclear fuel 653 is radially outward of the working air flow path 680 and nested entirely within the air bypass duct 688. The second nuclear fuel 655 is positioned partially in the air bypass duct 688 and partially in the working air flow path 680. The third nuclear fuel 657 is positioned fully in the working air flow path 680. In these positions, the working air flow in the working air flow path 680 is heated via the third nuclear fuel 657, and a portion of the second nuclear fuel 655. It will be appreciated that there can be any combination, or number of nuclear fuels, or heat exchangers in thermal communication with the working air flow path 680, or the air bypass duct 688.

Figure 11:
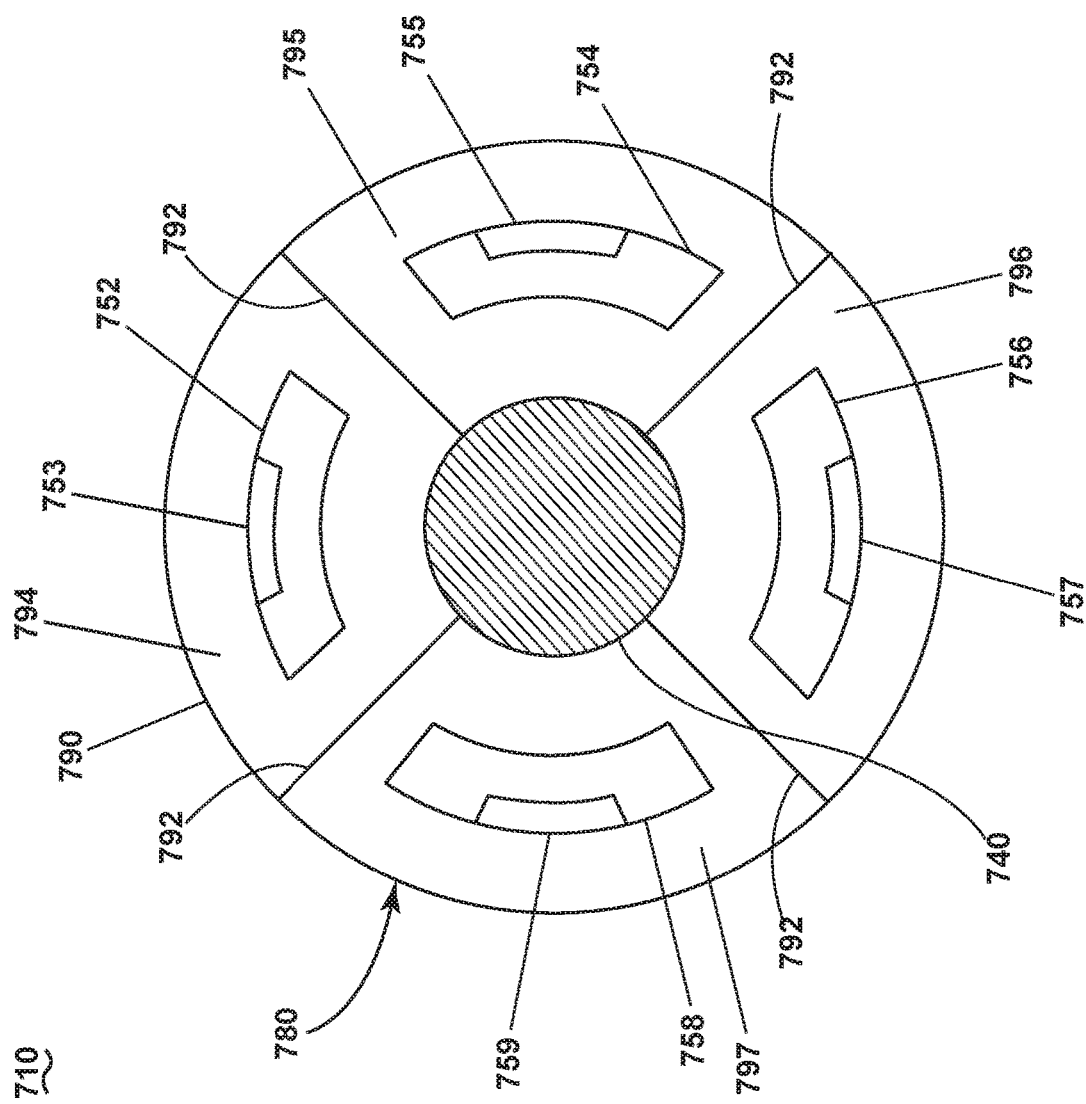
FIG. 11 is a cross section of the turbine engine of FIG. 1 illustrating the non-reactor, nuclear fuel heat exchangers.

FIG. 11 is a cross section of a working air flow path 780 of a turbine engine 710. The turbine engine 710 is similar to the turbine engine 10, 110, 210, 310, 410, 510, 610, therefore, like parts will be identified with like numerals further increased by 100, with it being understood that the description of the like parts of the turbine engine 10, 110, 210, 310, 410, 510, 610 applies to the turbine engine 710 unless otherwise noted. The turbine engine 710 includes a first heat exchanger 352, a second heat exchanger 754, a third heat exchanger 756, and a fourth heat exchanger 758. The first, second, third, and fourth heat exchangers 752, 754, 756, 758 can include a first, a second, a third, and a fourth nuclear fuel 753, 755, 757, 759 respectively. The first, second, third, and fourth heat exchangers 752, 754, 756, 758 can be circumferentially arranged about at least a portion of the drive shaft 740 within the working air flow path 780. A shielding 790, and a plurality of dividing walls 792 can thermally, and fluidly separate the first, second, third, and fourth heat exchangers 752, 754, 756, 758

The working air flow path 780 can be enclosed within the shielding 790. The plurality of dividing walls 792 can extend radially inward form the shielding 790 and converge to the drive shaft 740. One or more of the shielding 790, and the dividing walls 792 can be thermally insulating such that thermal energy cannot transfer from one side of one or more of the shielding 790 or dividing walls 792 to the other side.

The shielding 790, and the dividing walls 792 can define a plurality of channels 794, 795, 796, 797. The channels 794, 795, 796, 797 can axially extend along the drive shaft 740 and fully encapsulate the first, second, third, and fourth nuclear fuel 753, 755, 757, 759. The working air flow in the working air flow path 780 can flow through one or more of the channels 794, 795, 796, 797 and be in thermal communication with any number of the first, second, third, or fourth nuclear fuel 753, 755, 757, 759, or first, second, third, or fourth heat exchangers 752, 754, 756, 758.

A plurality of upstream gates, or downstream gates can be located upstream or downstream the first, second, third, or fourth heat exchangers 752, 754, 756, 758. The upstream gates, or the downstream gates can selectively channel the working air flow in the working air flow path 780 down any one or more of the channels 794, 795, 796, 797.

Benefits of the present disclosure include a longer runner turbine engine when using nuclear fuel as opposed to fossil fuels. It will be understood that as the nuclear fuel decays over time, the heat emitted from the nuclear fuel will decrease until replacement of the nuclear fuel is needed to operate the turbine engine at a predetermined state. For example, when the decay exceeds a predetermined threshold of 70 percent, the turbine engine will require refueling to run at the predetermined threshold of efficiency. By way of non-limiting example, the predetermined threshold can be 95% or less of the decay. Yet the time it takes for the nuclear fuel to decay enough to no longer be effective for operation of the turbine engine is much longer than the time it would take for a turbine engine of the same size utilizing conventional fossil fuel to run out of fuel. For example, where a conventional aircraft utilizing a jet-fueled turbine engine might operate for 16 hours before refueling, an aircraft using the turbine engine with the nuclear exchanger might operate for weeks to upwards of a year or more before refueling.

It is further contemplated that after the nuclear fuel has decayed past the predetermined threshold or when the nuclear fuel is not being used to power the turbine engine, the heat from the nuclear fuel can be used as an auxiliary heat. For example, in some instances the heat from the nuclear fuel will not be sufficient to run the turbine engine. As such, the nuclear fuel will still emit heat which can be used as the auxiliary heat. The auxiliary heat can be put into thermal communication with various sub-systems of the turbine engine or be channeled to various external systems. For example, the auxiliary heat can be used to deice various components of the turbine engine or the aircraft. Alternatively, or additionally, the auxiliary heat can be used to heat a building or produce ground power. As used herein, ground power can be any power which is directly used for ground appliances such as, but not limited to, lights, kitchen appliances, motors, electronic devices, heating, or the like. It is contemplated that the heat from the nuclear fuel can heat the working air flow to run the turbine engine and be used to can be used at the same time to heat various sub-systems of the turbine engine or be channeled to various external systems.

The nuclear fuel can have an energy density between 1,000 and 100,000 times greater than the energy density of conventional fossil fuel. The energy density can be defined as the amount of stored energy in a given system (i.e., the nuclear fuel, or the conventional fossil fuel) per unit volume of the fuel. Consequently, less weight has to be allocated for fuel purposes in the turbine engine than a conventional turbine engine. Additionally, the greater energy density of the nuclear fuel means that a lesser volume has to be used for the fuel meaning that the overall size of the turbine engine can be more compact that conventional turbine engines utilizing the conventional fossil fuel.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A turbine engine comprising a compressor section, and turbine section in serial flow arrangement to define a working air flow path, a heat exchanger in fluid communication with the working air flow path, a nuclear fuel in thermal communication with the working air flow path, and an air release valve in fluid communication with the working air flow path between the compressor section and the turbine section.

2. The turbine engine of any preceding clause wherein the wherein the nuclear fuel is provided within the heat exchanger.

3. The turbine engine of any preceding clause wherein the nuclear fuel is at least one of W181 or Ta182.

4. The turbine engine of any preceding clause wherein the nuclear fuel primarily decays through alpha or beta decay.

5. The turbine engine of any preceding clause wherein there are multiple heat exchangers Where each is in thermal communication with different types of the nuclear fuel.

6. The turbine engine of any preceding clause wherein the different types of the nuclear fuel have different half-lives.

7. The turbine engine of any preceding clause wherein the turbine section comprises a high-pressure turbine and a low-pressure turbine, and the air release valve comprises at least one of a high-pressure air release valve located upstream of the high-pressure turbine or a low-pressure air release valve located upstream of the low-pressure turbine.

8. The turbine engine of any preceding clause wherein the air release valve comprises at least both the high-pressure release valve and the low-pressure release valve.

9. The turbine engine of any preceding clause wherein the nuclear fuel is provided within the heat exchanger.

10. The turbine engine of any preceding clause wherein the nuclear fuel is at least one of W181 or Ta182.

11. The turbine engine of any preceding clause further comprising a combustor section in the working air flow path.

12. The turbine engine of claim 1 wherein the nuclear fuel is a non-fissile nuclear fuel.

13. A turbine engine comprising a compressor section, combustor section, and turbine section in serial flow arrangement to define a working air flow path, a non-reactor, nuclear fuel heat exchanger in thermal communication with the working air flow path between the compressor section and the combustor section, and an air release valve in fluid communication with the working air flow path between the combustor section and the turbine section.

14. The turbine engine of any preceding clause wherein the heat exchanger is selectively in fluid communication with the working air flow path;

15. The turbine engine of any preceding clause wherein the heat exchanger is moveable relative to the working air flow path.

16. The turbine engine of any preceding clause wherein the heat exchanger is in thermal communication with the non-fissile nuclear fuel.

17. The turbine engine of any preceding clause wherein there are multiple heat exchangers with each heat exchanger being in thermal communication with different types of the non-fissile nuclear fuel.

18. The turbine engine of any preceding clause wherein the different types of the non-fissile nuclear fuel have different half-lives.

19. The turbine engine of any preceding clause wherein the non-fissile nuclear fuels are either at least one of W181 or Ta182.

20. The turbine engine of any preceding clause wherein the heat exchanger is fluidly coupled to the working air flow path upstream of the combustor section.

21. The turbine engine of any preceding clause wherein the heat exchanger is in serial flow arrangement with the compressor section and the turbine section.

22. The turbine engine of any preceding clause wherein the air release valve is in fluid communication with the working air flow path upstream of the turbine section.

23. The turbine engine of any preceding clause wherein the turbine section comprises at least two sub-sections and the air release valve is fluidly coupled to the working air flow path upstream of at least one of the two sub-sections.

24. The turbine engine of any preceding clause wherein the at least two sub-sections comprise a high-pressure turbine and a low-pressure turbine.

25. The turbine engine of any preceding clause wherein the air release valve comprises at least one of a high-pressure air release valve located upstream of the high-pressure turbine or a low-pressure air release valve located upstream of the low-pressure turbine.

26. A turbine engine comprising a compressor section, combustor section, and turbine section in serial flow arrangement to define a working air flow path, a non-reactor, nuclear fuel heat exchanger in thermal communication with the working air flow path between the compressor section and the combustor section, and an air release valve in fluid communication with the working air flow path between the combustor section and the turbine section.

27. The turbine engine of any preceding clause wherein the non-reactor, nuclear fuel heat exchanger is in thermal communication with a non-fissile nuclear fuel.

28. The turbine engine of any preceding clause wherein the non-fissile nuclear fuel is at least one of W181 or Ta182.

29. The turbine engine of any preceding clause wherein the non-fissile nuclear fuel primarily decays through alpha or beta decay.

30. The turbine engine of any preceding clause wherein the non-fissile nuclear fuel comprises different types of non-fissile nuclear fuel.

31. The turbine engine of any preceding clause wherein the different types of non-fissile nuclear fuels have different half-lives.

32. The turbine engine of any preceding clause wherein the turbine section comprises a high-pressure turbine and a low-pressure turbine, and the air release valve comprises at least one of a high-pressure air release valve located upstream of the high-pressure turbine or a low-pressure air release valve located upstream of the low-pressure turbine.

33. The turbine engine of any preceding clause wherein the air release valve comprises at least both the high-pressure release valve and the low-pressure release valve.

34. The turbine engine of any preceding clause wherein the non-reactor, nuclear fuel heat exchanger comprises non-fissile nuclear fuel.

35. The turbine engine of any preceding clause wherein the non-fissile nuclear fuel is at least one of W181 or Ta182.

36. A method of operating a turbine engine with a compressor section and a turbine section in serial flow arrangement to define a working air flow path, the method comprising heating the working air flow path by selectively exposing the working air flow path to heat generated by a nuclear fuel.

37. The method of any preceding clause wherein heating the working air flow path includes continuously heating the working air flow path with the nuclear fuel in thermal communication with a heat exchanger to define a primary heat source.

38. The method of any preceding clause further comprising intermittently heating the working air flow path by combusting fossil fuel in a combustor section to define a secondary heat source.

39. The method of any preceding clause further comprising controlling a rotational speed of the turbine engine by fluidly coupling the working air flow path to atmosphere upstream of the turbine section.

40. The method of any preceding clause wherein fluidly coupling the working air flow path to atmosphere comprises selectively fluidly coupling the working air flow path to atmosphere.

41. The method of any preceding clause wherein fluidly coupling the working air flow path to atmosphere upstream of the turbine section comprises fluidly coupling the working air flow path to atmosphere upstream of at least one sub-section of the turbine section.

42. The method of any preceding clause wherein the continuously heating comprises continuously heating the working air flow path upstream of a combustor.

43. The method of any preceding clause wherein the continuously heating comprises continuously heating the working air flow path downstream of the compressor.

44. The method of any preceding clause wherein the continuously heating comprises selectively thermally exposing different types of nuclear fuel to the working air flow path.

45. The method of any preceding clause wherein the different types of the nuclear fuel have different half-lives.

46. The method of any preceding clause further comprising thermally exposing the working air flow path to different heat generated by different types of the nuclear fuel.

47. The method of any preceding clause wherein the different types of the nuclear fuel differ in rates of decay.

48. The method of any preceding clause further comprising controlling the thrust or output of the turbine engine by selectively exhausting a portion of the working air flow to bypass at least a portion turbine section.

49. A turbine engine comprising a compressor section, combustor section, and turbine section in serial flow arrangement to define a working air flow path, a heat exchanger in fluid communication with the working air flow path between the compressor section and the turbine section, a nuclear fuel in thermal communication with the heat exchanger, and an air release valve in fluid communication with the working air flow path between the compressor section and the turbine section.

50. The turbine engine of any preceding clause wherein the wherein the nuclear fuel is provided within the heat exchanger.

51. The turbine engine of any preceding clause wherein the nuclear fuel is at least one of W181 or Ta182.

52. The turbine engine of any preceding clause wherein the nuclear fuel has primarily alpha or beta decay of radiation.

53. The turbine engine of any preceding clause wherein there are multiple heat exchangers where each is in thermal communication with different types of the nuclear fuel.

54. The turbine engine of any preceding clause wherein the different types of the nuclear fuel have different half-lives.

55. The turbine engine of any preceding clause wherein the turbine section comprises a high-pressure turbine and a low-pressure turbine, and the air release valve comprises at least one of a high-pressure air release valve located upstream of the high-pressure turbine or a low-pressure air release valve located upstream of the low-pressure turbine.

56. The turbine engine of any preceding clause wherein the air release valve comprises at least both the high-pressure release valve and the low-pressure release valve.

57, The turbine engine of any preceding clause wherein the nuclear fuel is provided within the heat exchanger.

58. The turbine engine of any preceding clause wherein the nuclear fuel is at least one of W181 or Ta182.

59. A turbine engine comprising a compressor section and a turbine section in serial flow arrangement to define a working air flow path, a heat exchanger in fluid communication with the working air flow path, a nuclear fuel in thermal communication with the heat exchanger, and an air release valve in fluid communication with the working air flow path between the compressor section and the turbine section.

60. The turbine engine of any preceding clause wherein the heat exchanger is selectively in fluid communication with the working air flow path;

61. The turbine engine of any preceding clause wherein the heat exchanger is moveable relative to the working air flow path.

62. The turbine engine of any preceding clause wherein the heat exchanger is in thermal communication with the nuclear fuel.

63. The turbine engine of any preceding clause wherein there are multiple heat exchangers with each heat exchanger being in thermal communication with different types of the nuclear fuel.

64. The turbine engine of any preceding clause wherein the different types of nuclear fuel have different half-lives.

65. The turbine engine of any preceding clause wherein the nuclear fuels are either at least one of W181 or Ta182.

66. The turbine engine of any preceding clause wherein the heat exchanger is fluidly coupled to the working air flow path upstream of the combustor section.

67. The turbine engine of any preceding clause wherein the heat exchanger is in serial flow arrangement with the compressor section and the turbine section.

68. The turbine engine of any preceding clause wherein the air release valve is in fluid communication with the working air flow path upstream of the turbine section.

69. The turbine engine of any preceding clause wherein the turbine section comprises at least two sub-sections and the air release valve is fluidly coupled to the working air flow path upstream of at least one of the two sub-sections.

70. The turbine engine of any preceding clause wherein the at least two sub-sections comprise a high-pressure turbine and a low-pressure turbine.

71. The turbine engine of any preceding clause wherein the air release valve comprises at least one of a high-pressure air release valve located upstream of the high-pressure turbine or a low-pressure air release valve located upstream of the low-pressure turbine.

72. A method of operating a turbine engine with a compressor section, combustor section, and turbine section in serial flow arrangement to define a working air flow path, the method comprising continuously heating the working air flow path with a nuclear fuel in thermal communication with a heat exchanger to define a primary heat source, and intermittently heating the working air flow path by combusting fossil fuel in the combustor section to define a secondary heat source.

73. The method of any preceding clause further comprising controlling a rotational speed of the turbine engine by fluidly coupling the working air flow path to atmosphere upstream of the turbine section.

74. The method of any preceding clause wherein fluidly coupling the working air flow path to atmosphere comprises selectively fluidly coupling the working air flow path to atmosphere.

75. The method of any preceding clause wherein fluidly coupling the working air flow path to atmosphere upstream of the turbine section comprises fluidly coupling the working air flow path to atmosphere upstream of at least one sub-section of the turbine section.

76. The method of any preceding clause wherein the continuously heating comprises continuously heating the working air flow path upstream of the combustor.

77. The method of any preceding clause wherein the continuously heating comprises continuously heating the working air flow path downstream of the compressor.

78. The method of any preceding clause wherein the continuously heating comprises selectively exposing different types of nuclear fuel to the working air flow path.

79. The method of any preceding clause wherein the different types of the nuclear fuel have different half-lives.

80. A method of operating a turbine engine with a compressor section and a turbine section in serial flow arrangement to define a working air flow path, the method comprising heating the working air flow path by selectively exposing the working air flow path to heat generated by a nuclear fuel.

81. The method of any preceding clause further comprising exposing the working air flow path to different heat generated by different types of the nuclear fuel.

82. The method of any preceding clause wherein the different types of the nuclear fuel differ in rates of decay.

What claimed is:

1. A turbine engine having a working airflow providing thrust for an aircraft, comprising:
    a compressor section, and turbine section in serial flow arrangement to define a working air flow path;
    a heat exchanger in fluid communication with the working air flow path;
    a nuclear fuel in thermal communication with the working air flow path; and
    an air release valve in fluid communication with the working air flow path between the compressor section and the turbine section for controlling the thrust.

2. The turbine engine of claim 1 wherein the nuclear fuel is provided within the heat exchanger.

3. The turbine engine of claim 2 wherein the nuclear fuel is at least one of W181 or Ta182.

4. The turbine engine of claim 2 wherein the nuclear fuel primarily decays through alpha or beta decay.

5. The turbine engine of claim 2 wherein there are multiple heat exchangers where each is in thermal communication with different types of the nuclear fuel.

6. The turbine engine of claim 5 wherein the different types of the nuclear fuel have different half-lives.

7. The turbine engine of claim 1 wherein the turbine section comprises a high-pressure turbine and a low-pressure turbine, and the air release valve comprises at least one of a high-pressure air release valve located upstream of the high-pressure turbine or a low-pressure air release valve located upstream of the low-pressure turbine.

8. The turbine engine of claim 7 wherein the air release valve comprises at least both the high-pressure air release valve and the low-pressure air release valve.

9. The turbine engine of claim 8 wherein the nuclear fuel is provided within the heat exchanger.

10. The turbine engine of claim 9 wherein the nuclear fuel is at least one of W181 or Ta182.

11. The turbine engine of claim 1 further comprising a combustor section in the working air flow path.

12. The turbine engine of claim 1 wherein the nuclear fuel is a non-fissile nuclear fuel.

13. A turbine engine having a working airflow providing thrust for an aircraft, comprising:
    a compressor section, combustor section, and turbine section in serial flow arrangement to define a working air flow path;
    a non-reactor, nuclear fuel heat exchanger in thermal communication with the working air flow path between the compressor section and the combustor section; and
    an air release valve in fluid communication with the working air flow path between the combustor section and the turbine section for controlling the thrust.

14. The turbine engine of claim 13 wherein the non-reactor, nuclear fuel heat exchanger is in thermal communication with a non-fissile nuclear fuel.

15. The turbine engine of claim 14 wherein the non-fissile nuclear fuel is at least one of W181 or Ta182.

16. The turbine engine of claim 14 wherein the non-fissile nuclear fuel primarily decays through alpha or beta decay.

17. The turbine engine of claim 14 wherein the non-fissile nuclear fuel comprises different types of non-fissile nuclear fuel.

18. The turbine engine of claim 17 wherein the different types of non-fissile nuclear fuel have different half-lives.

19. The turbine engine of claim 13 wherein the turbine section comprises a high-pressure turbine and a low-pressure turbine, and the air release valve comprises at least one of a high-pressure air release valve located upstream of the high-pressure turbine or a low-pressure air release valve located upstream of the low-pressure turbine.

20. The turbine engine of claim 19 wherein the air release valve comprises at least both the high-pressure air release valve and the low-pressure air release valve.

21. The turbine engine of claim 1, wherein the nuclear fuel is in selective thermal communication with the working air flow path.

22. The turbine engine of claim 1, wherein heat exchanger is selectively in fluid communication with the working air flow path.

23. The turbine engine of claim 13, wherein the nuclear fuel is in selective thermal communication with the working air flow path.

24. The turbine engine of claim 13, wherein non-reactor, nuclear fuel heat exchanger is selectively in fluid communication with the working air flow path.

* * * * *